United States Patent
Okada (10) Patent No.: US 12,143,360 B2
(45) Date of Patent: Nov. 12, 2024

(54) NETWORK MANAGEMENT FOR BLOCKING UNAUTHORIZED ACCESS

(71) Applicant: RAKUTEN MOBILE, INC., Tokyo (JP)

(72) Inventor: Yoshimi Okada, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/792,277

(22) PCT Filed: Apr. 6, 2022

(86) PCT No.: PCT/JP2022/017145
§ 371 (c)(1),
(2) Date: Jul. 12, 2022

(87) PCT Pub. No.: WO2023/195090
PCT Pub. Date: Oct. 12, 2023

(65) Prior Publication Data
US 2024/0179120 A1    May 30, 2024

(51) Int. Cl.
*H04L 9/40*    (2022.01)

(52) U.S. Cl.
CPC ...... *H04L 63/0236* (2013.01); *H04L 63/1425* (2013.01)

(58) Field of Classification Search
CPC ............. H04L 63/0236; H04L 63/1425; H04L 63/1441; H04L 63/14; H04L 63/1466
See application file for complete search history.

(56) References Cited

U.S. PATENT DOCUMENTS

| | | | |
|---|---|---|---|
| 2005/0198519 A1* | 9/2005 | Tamura | H04L 63/1408 713/188 |
| 2009/0260079 A1* | 10/2009 | Anbo | G06T 7/97 382/218 |
| 2012/0163196 A1* | 6/2012 | Jansen | H04L 61/35 370/256 |

FOREIGN PATENT DOCUMENTS

| | | | |
|---|---|---|---|
| JP | 2005210601 A | * | 8/2005 |
| JP | 2017200152 A | * | 11/2017 |

* cited by examiner

*Primary Examiner* — Anh Nguyen
(74) *Attorney, Agent, or Firm* — Sughrue Mion, PLLC (57) ABSTRACT

The communication control apparatus (10) performs a receiving process, a counting process, and a determination process. The receiving process is a process for receiving a request packet to query a predetermined server. The counting process is a process for counting, based on a source address of the request packet, in multiple stages corresponding to different ranges of address areas that include the source address. The determination process is a process for determining an address area corresponding to a stage, from the multiple stage, in which a count value by the counting process exceeds a predetermined threshold value as an unauthorized access address area.

8 Claims, 6 Drawing Sheets

NETWORK MANAGEMENT FOR BLOCKING UNAUTHORIZED ACCESS

TECHNICAL FIELD

The present invention relates to network management for blocking unauthorized access.

BACKGROUND ART

In recent years, Denial of Service (DOS) attacks have become a problem by sending large numbers of invalid requests to servers such as servers on the Internet, Domain Name System (DNS) servers, mail servers, and other servers, to increase their load and bring them down. To deal with such a problem, for example, a technology has been proposed to perform a count with a predetermined network mask (a prefix length) based on a source address, identify a source address corresponding to the number of counts exceeding a predetermined threshold, and control not to receive a packet from the identified source address (Patent Literature 1).

LISTING OF REFERENCES

Patent Literature

PATENT LITERATURE 1: Laid-open Publication of Japanese patent Application No. 2005-210601 A

SUMMARY OF THE INVENTION

Problems to be Solved by the Invention

The technology disclosed in Patent Literature 1 makes it possible to restrict access by an address with a network mask corresponding to counts that exceed the predetermined threshold. However, in a case where the network mask is short, access by an address belonging to a wider area could be restricted. In such a case, access by a large number of users who are not involved in unauthorized access could be restricted, and as a result, user convenience may be reduced.

In addition, in case of using IPv4 (Internet Protocol When using Version 4) address, filtering with a specified address for unauthorized access is available. However, in case of using IPv6 address, such a conventional filtering is not available. In other words, since IPv6 handles a huge number of addresses, the conventional filtering with the specified address is practically unavailable.

The present invention has been made in order to the above mentioned problems and an object thereof is to provide a technique for properly determining an address area of an unauthorized access.

Solution to Problem

In order to solve the above mentioned problems, according to one aspect of the present invention, there is provided a communication control apparatus which comprises: at least one processor; wherein the at least one processor being configured execute a receiving process, a counting process, and a determination process. The receiving process is a process for receiving a request packet to query a predetermined server. The counting process is a process for counting, based on a source address of the request packet, in multiple stages corresponding to different ranges of address areas that include the source address. The determination process is a process for determining an address area corresponding to a stage, from the multiple stage, in which a count value by the counting process exceeds a predetermined threshold value as an unauthorized access address area that is a source of an unauthorized access.

In order to solve the above mentioned problems, according to another aspect of the present invention, there is provided a communication control method which comprises: receiving a request packet to query a predetermined server; counting, based on a source address of the request packet, in multiple stages corresponding to different ranges of address areas that include the source address; and determining an address area corresponding to a stage, from the multiple stage, in which a count value by the counting process exceeds a predetermined threshold value as an unauthorized access address area that is a source of an unauthorized access.

In order to solve the above mentioned problems, according to yet another aspect of the present invention, there is provided a computer-readable storage medium storing a program, the program, when executed by at least one processor in a communication control apparatus, for causing the communication control apparatus to execute a receiving process, a counting process, and a determination process. The receiving process is a process for receiving a request packet to query a predetermined server. The counting process is a process for counting, based on a source address of the request packet, in multiple stages corresponding to different ranges of address areas that include the source address. The determination process is a process for determining an address area corresponding to a stage, from the multiple stage, in which a count value by the counting process exceeds a predetermined threshold value as an unauthorized access address area that is a source of an unauthorized access.

Advantageous Effect of the Invention

According to the present invention, it makes it possible to properly determine an address area of an authorized access.

DESCRIPTION OF EMBODIMENTS

Hereinafter, embodiments of the present invention will be described in detail with reference to the accompanying drawings. Among the constituent elements disclosed below, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

(Configuration of Communication System)

Figure 1:
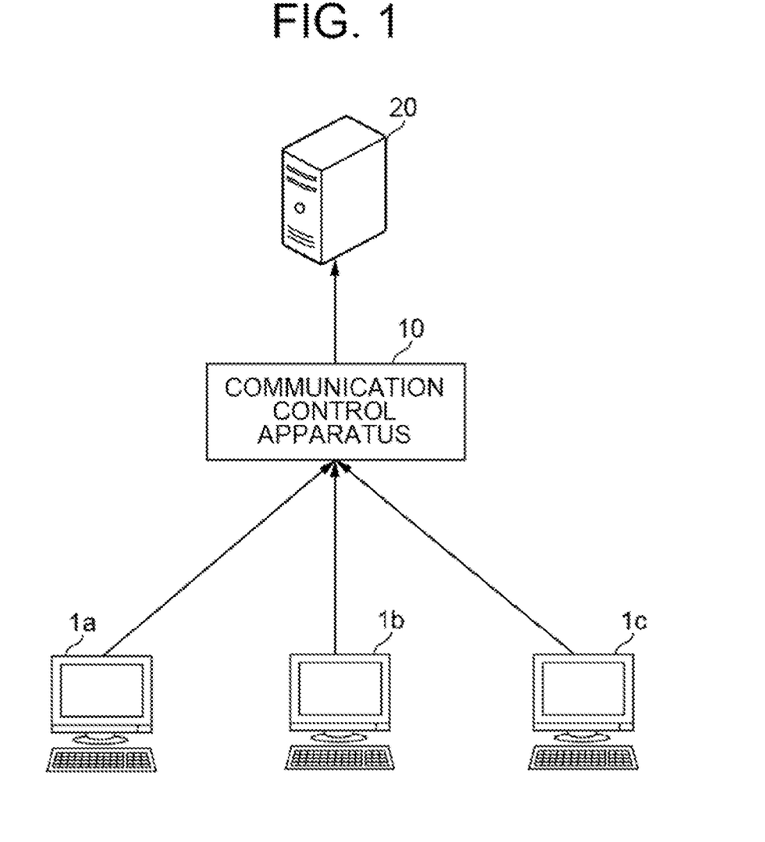
FIG. 1 illustrate an example configuration of a communication system according to the present embodiment.

FIG. 1 illustrates an example of a configuration of a communication system according to the present embodiment. As an example, as shown in FIG. 1, the communication system comprises user devices 1a to 1c, a communication control apparatus 10, and a communication server apparatus 20. The user devices 1a to 1c and the communication control apparatus 10 as well as the communication control apparatus 10 and the communication server apparatus 20 are connected by a communication network capable of data transmission including packet transmission compliant with Internet Protocol (IP) via communication medium, regardless of whether the medium is wired or wireless.

FIG. 1 shows three user devices 1a to 1c, but the number of user devices is not limited to a specific number. In the following description, the user devices 1a to 1c are collectively referred to as the user device 1 unless otherwise specified. In the following descriptions, the term "user device" and the term "user who uses the user device" may be used interchangeably.

The communication server apparatus 20 is, for example, a web server on the Internet, a Domain Name System (DNS) server or a mail server. The communication server apparatus 20 is configured to receive a request packet for a predetermined inquiry from the user device 1 via the communication control apparatus 10 and return a response packet corresponding to the request.

In the present embodiment, the communication server apparatus 20 is assumed to be a DNS server and is configured to manage the domain name (i.e., an address on the Internet) in association with an IP address. The user device 1 transmit, to the communication server apparatus 20, a request packet containing the domain name (hereinafter, simply referred to as "a request packet") for inquiring the IP address corresponding to the domain name to be accessed by the user device 1. The communication control apparatus 10 transmits the received request packet to the communication server apparatus 20. The communication server apparatus 20 receives the request packet from the user device 1 via the communication control apparatus 10 and returns a response packet including the IP address corresponding to the domain name.

The user device 1 may refer to a mobile or fixed user-end device such as a user equipment (UE), a mobile station (MS), mobile station equipment, a mobile terminal, a subscriber unit, a subscriber station, a wireless terminal, and a mobile device. The terminal apparatus 11I may also be a device such as a cellular phone, a smart phone, a personal digital assistant (PDA), a tablet, a laptop, a handheld communication device, and a handheld computing device, a satellite radio, a wireless modem card, or a Customer Premises Equipment (CPE).

(Functional Configuration of Communication Control Apparatus)

The communication control apparatus 10 according to the present embodiment is configured to receive, from the user device 1, a request packet containing the domain name to be accessed by the user device 1, and transmit the request packet to the communication server apparatus 20. Each the user devices 1a to 1c is configured to transmit the request packets at any time. In the present embodiment, it is assumed that there is a malicious user among the users of the user devices 1a to 1c. Specifically, the malicious user may transmit a large number of the request packets to the communication server apparatus 20 within a certain period of time to perform Denial of Service (DOS) attack in which the load is increased on the communication server apparatus 20 and the service becomes practically unavailable. In order to counter such an attack, the communication control apparatus 10 analyzes the contents and the number of received the request packets, and in a case where it is determined that the request is an unauthorized request, it blocks the request packet. In other words, the communication control apparatus 10 controls not to transmit the request packet to the communication server apparatus 20.

Figure 2:
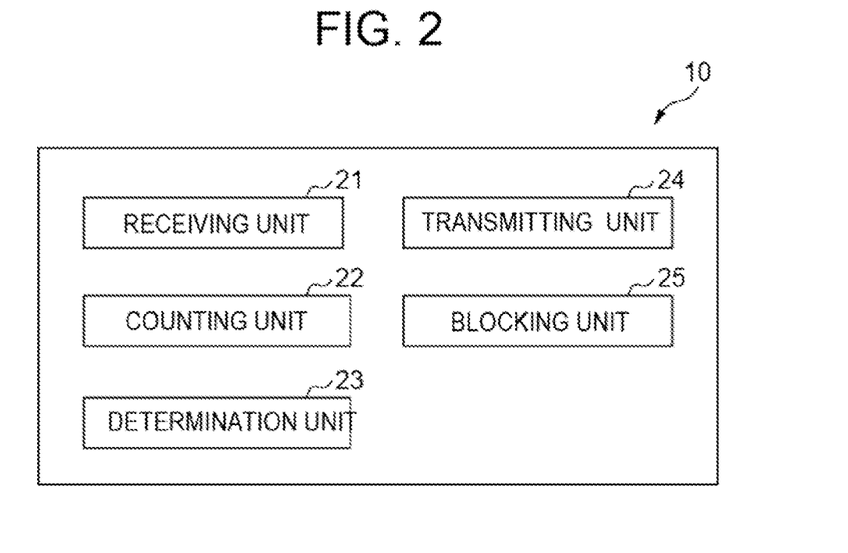
FIG. 2 illustrates an example of a functional configuration of a communication control apparatus according to the present embodiment.

FIG. 2 illustrates an example of a functional configuration of the communication control apparatus 10.

The communication control apparatus 10 shown in FIG. 2 comprises a receiving unit 21, a counting unit 22, a determination unit 23, a transmitting unit 24, and a blocking unit 25.

The receiving unit 21 receives a request packet from the user device 1 that include the domain name to be accessed by the user device 1. In addition to the domain name, the request packet may include the source address, the destination address, and other information.

The counting unit 22 counts the number of the request packets received by the receiving unit 21 based on the source address. Specifically, the counting unit 22 firstly specifies (sets) multiple prefix lengths arbitrarily. Then, the counting unit 22 counts the number of the request packets including the source address based on the arbitrarily specified multiple prefix lengths. The prefix length is a length (i.e., a numerical value) that indicates how many bits from the beginning of the IP address of the source address represent the network address, i.e., the network address portion, and represented by /xx (where xx is the length). The shorter the length (i.e., smaller the value), the wider the network. The process of the counting unit 22 is described below.

The determination unit 23 determines whether the received request packet is an authorized request packet or not by comparing the number of packets counted by the counting unit 22 with a predetermined threshold value. In the present embodiment, the determination unit may make the determination based on the number of receptions (i.e., the number of packets) during a certain period of time from any point in time. Therefore, the threshold value is defined by the number of packets in a certain period of time. The threshold value may be preset in the communication system according to experience or policy or may be set by the operator via an input unit (i.e., an input unit 35 in FIG. 3). The determination unit 23 may also change the set threshold value in response to changes in the network environment. The determination process of the determination unit 23 is described below.

The transmitting unit 24 transmits the request packet received by the receiving unit 21 to the communication server apparatus 20. However, in a case where the determination unit 23 determines that the request packet is an unauthorized request packet, it does not transmit the packet to the communication server apparatus 20.

The blocking unit 25 blocks (does not receive), in a case where it is determined that the request packet is an unauthorized request packet by the determination unit 23, an access from the source of the packet to the communication server apparatus 20. For example, the blocking unit 25 may discard the packets. The blocking unit 25 may also be configured to notify an external device of the source of the unauthorized request packet as the source of the unauthorized request.

(Hardware Configuration of Communication Control Apparatus)

Figure 3:
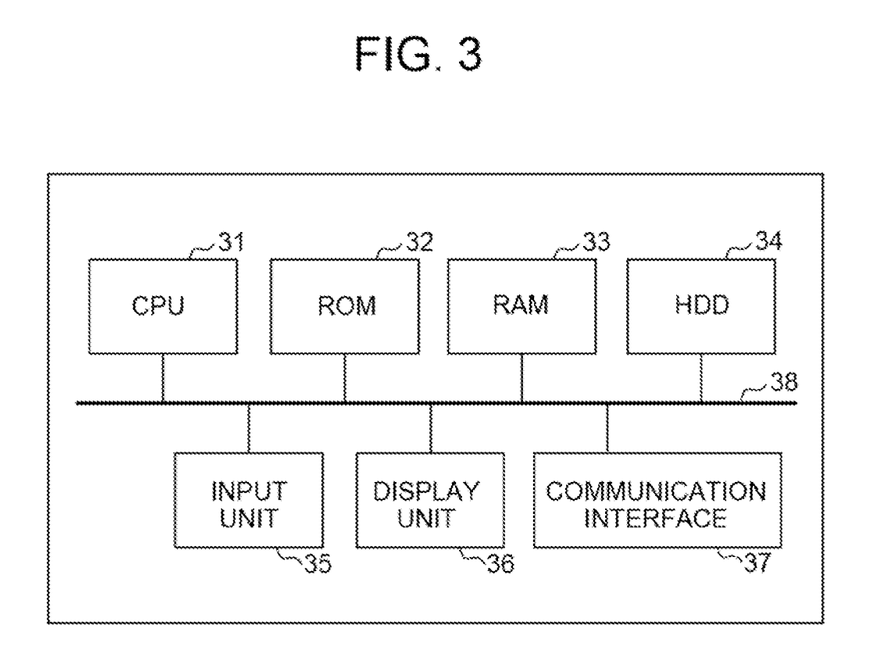
FIG. 3 illustrates an example of a hardware configuration of a communication control apparatus according to the present embodiment.

FIG. 3 illustrates an example of a hardware configuration of the communication control apparatus 10 according to the present embodiment.

The communication control apparatus 10 in the present embodiment may be implemented on a single or multiple, any computer or any other processing platform. The communication control apparatus 10 may be implemented on a general-purpose server device comprising a cloud, or on a dedicated server device.

Referring to FIG. 3, the communication control apparatus 10 is shown as being implemented in a single computer, while the communication control apparatus 10 according to the present embodiment may implemented in a computer system including multiple computers. The following is an example of a case in which this is the case. The plurality of computers may be connected communicatively with each other by a wired or wireless network.

As shown in FIG. 3, the communication control apparatus 10 consists of a Central Processing (CPU) 31 and a Read Only Memory (ROM) 32, a Random Access Memory (RAM) 33, a Hard Disc Drive (HDD) 34, an input unit 35, a display unit 36, a communication interface (I/F) 37 and a system bus 38. The communication control apparatus 10 may also be equipped with an external memory.

The CPU 31 is for controlling the operation of each of the components (i.e., the components 32 to 37) via the system bus 38 which is a data transmission path to control the overall operation in the communication control apparatus 10.

The ROM 32 is a nonvolatile memory that stores a control program or the like which is necessary for the CPU 31 executing processing. The program may be stored in a non-volatile memory such as the HDD 34, a Solid-State Drive (SSD), or in an external memory such as a removable storage medium (not shown).

The RAM 33 is a volatile memory and functions as the main memory, work area, etc., for CPU 31. In other words, the CPU 31, when executing processing, loads the necessary programs, etc., stored in the ROM 32 onto the RAM 33 and executes the program to realize various functional operations.

The HDD 34 stores, for example, various data, various information, etc., necessary for the CPU 31 executing processing. Also, the HDD 34 stores, for example, various data, various information, etc., obtained through processing by the CPU 31.

The input unit 35 may be composed of a pointing device such a keyboard or a mouse.

The display unit 36 may be composed of a monitor such as a liquid crystal display (LCD). The display 36 may provide a Graphical User Interface (GUI) for inputting, to the communication control apparatus 10, various parameters or communication parameters used in communication with other devices.

The communication I/F 37 is an interface that controls communication between the communication control apparatus 10 and external devices.

At least some of the functions of each functional element of the communication control apparatus 10 shown in FIG. 2 may be realized by the CPU 31 executing the program. However, at least some of the functions of each functional element of the communication control apparatus 10 shown in FIG. 2 may be operated as dedicated hardware. In such case, the dedicated hardware operates under the control of the CPU 31.

(Processing Flow)

Figure 4:
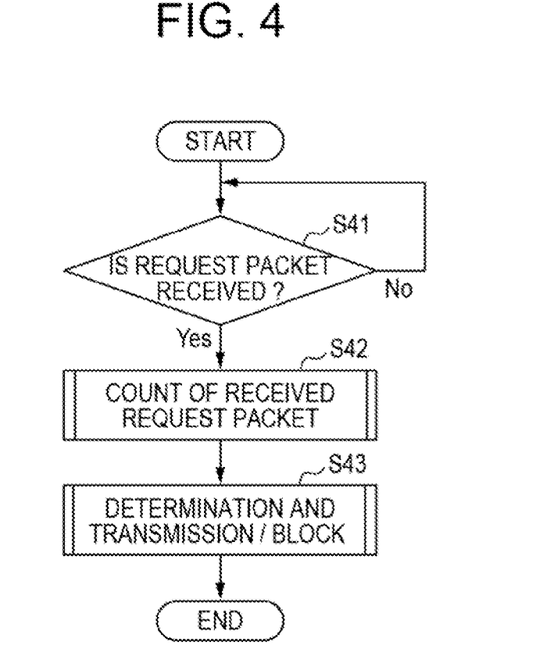
FIG. 4 illustrates a flowchart of a process performed by a communication control apparatus according to the present embodiment.

Next, a processing flow in the present embodiment is described referring to FIG. 4. FIG. 4 illustrates a flowchart of the processing performed by the communication control apparatus 10 according to the present embodiment. The process shown in FIG. 4 is described referring to the example configuration of the communication system shown in FIG. 1.

The process shown in FIG. 4 may be realized by the CPU 31 of the communication control apparatus 10 executing the control program stored in the ROM 32, the RAM 33, or the like and executing information computation and processing as well as control of hardware.

In S41, in a case where the receiving unit 21 receives a request packet from at least one of the user devices 1a to 1c (Yes in S41), the process proceeds to S42. As described above, the request packet contains at least the domain name to be accessed by the user device, the IP address of the user device as the source address of the packet, and the destination address.

Figure 5:
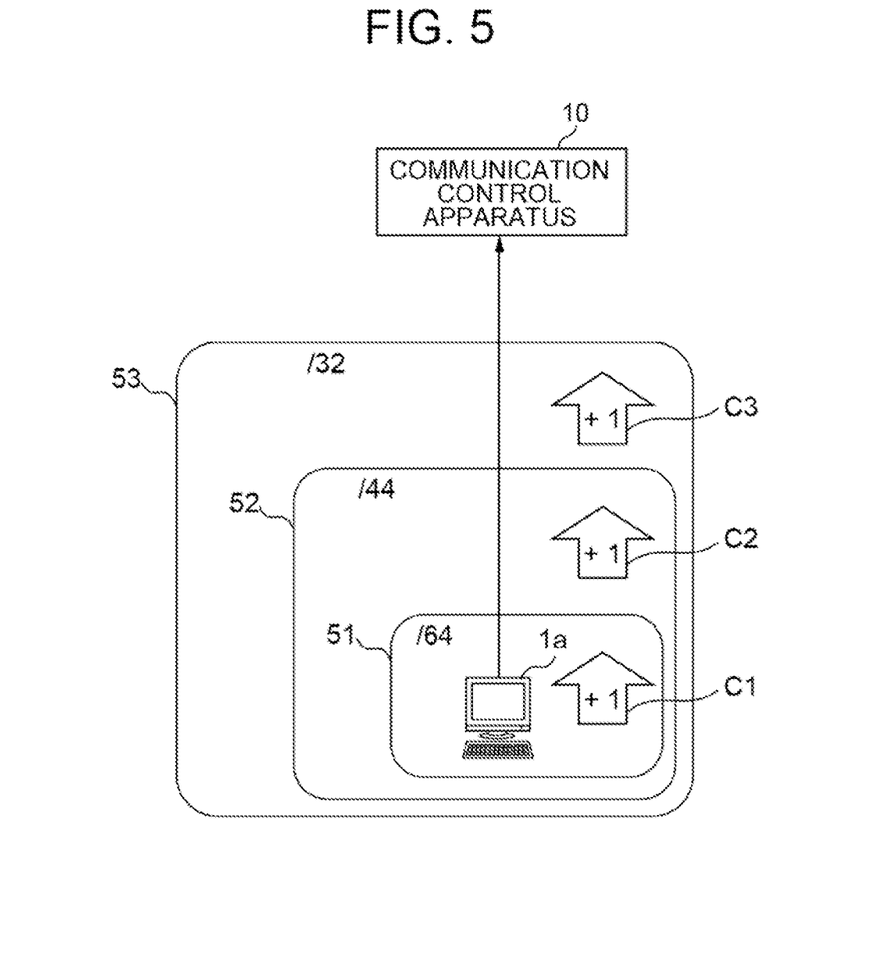
FIG. 5 is a conceptual diagram to describe a request packet counting process.

In S42, the counting unit 22 counts the request packets received by the receiver unit 21 in multiple stages based on the prefix lengths arbitrarily specified. The counting process is described with reference to FIG. 5. FIG. 5 is a conceptual diagram to describe the request packet counting process.

FIG. 5 illustrates an example of the user device 1a transmitting a request packet to the communication control apparatus 10 in the communication system shown in FIG. 1. The smallest network that manages the IP address as the source address used by the user device 1a to transmit the request packet is a first network 51 (prefix length=64). The network that encompasses the first network 51 is a second network 52 (prefix length=44). The network that encompasses the second network 52 is a third network 53 (prefix length=32). The network range increases in the order of the first network 51, the second network 52, the third network 53. The prefix length for each of the network shown in FIG. 5 is an example and may be specified arbitrarily by the counting unit 22.

In such a configuration, the counting unit 22 counts the received request packet in the multiple stages according to the source IP address with different prefix lengths (64, 44, and 32 in the example in FIG. 5). In the example in FIG. 5, the counting unit 22 counts the request packet from the source IP address, the request packet from the first network 51 (i.e., the address area with the prefix length=64) as C1, the request packet from the second network 52 (i.e., the address area with the prefix length=44) as C2, and the request packet from the third network 53 (i.e., the address area with the prefix length=32) as C3. After counting the request packets by the counting unit 22, the process proceeds to S43.

In S43, the determination unit 23 determines whether the received request packet is an authorized packet or not based on the number of packets counted by the counting unit 22 over a certain period of time. Based on the determination, the transmitting unit 24 transmits the request packet to the communication server apparatus 20, or the blocking unit 25 controls to block access from the source of the request packet.

Figure 6:
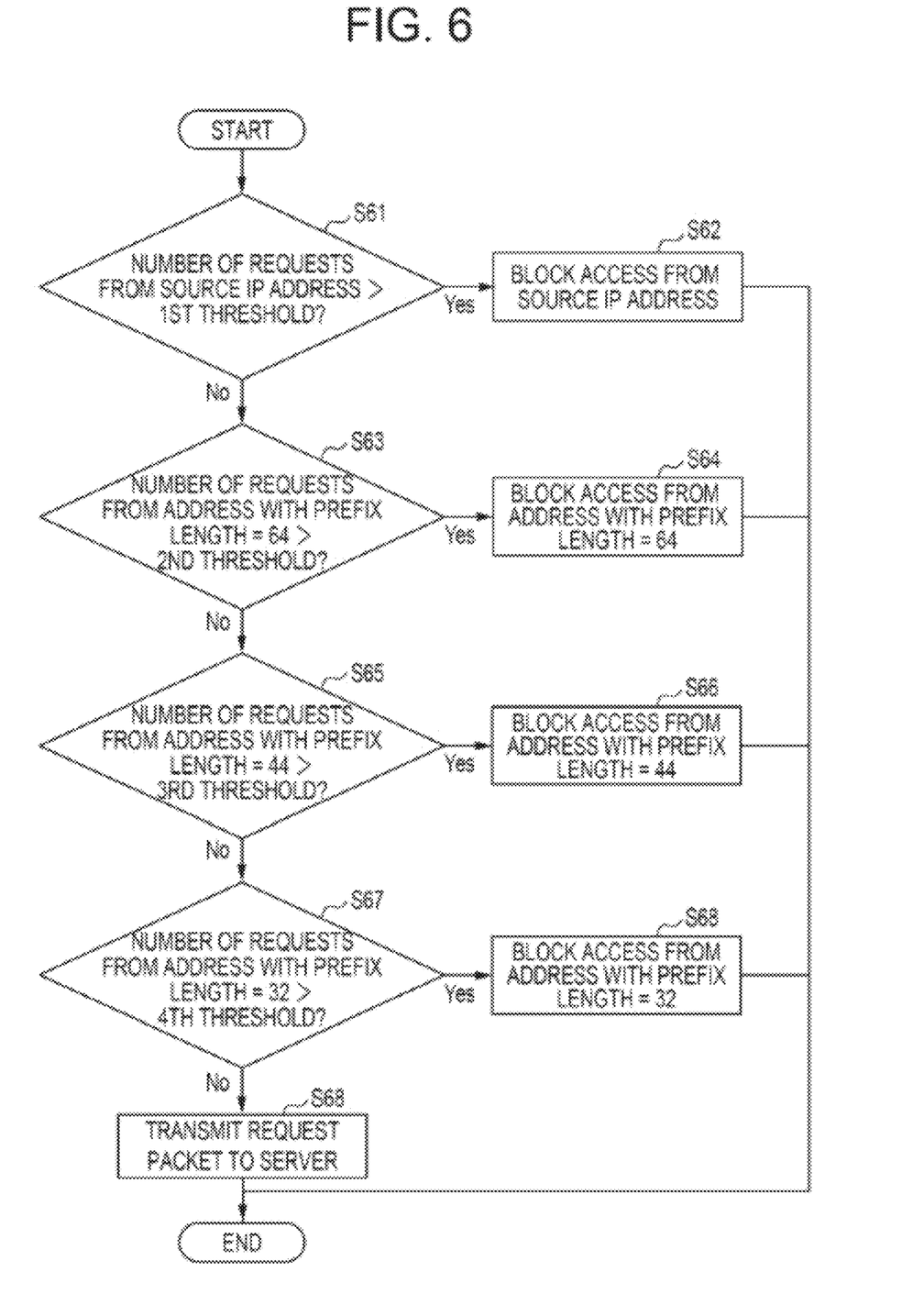
FIG. 6 is a flowchart showing a processing flow of determining whether or not a request packet is an unauthorized request packet and transmitting/blocking the packet.

The process in S43 process is described with reference to FIG. 6. FIG. 6 is a flowchart showing a processing flow of determining whether or not the request packet is an unauthorized request packet and transmitting/blocking the packet. The 1st to 4th threshold values are used for the determination. As mentioned above, the threshold values may be pre-set in the communication system or may be set by the operator via the input unit 35. The determination unit 23 may change the threshold values in response to changes in the network environment.

In FIG. 6, as an example, the 1st to 4th threshold values are the numbers of received request packets allowed per second, and the first threshold=100, the 2nd threshold=100, 000, the 3rd threshold==3,000,000, and the 4th threshold=1, 000,000,000,000. In this way, the threshold may be set so as to increase in the order of the 1st to 4th threshold values.

In S61, the determination unit 23 determines whether the number of the request packets from the source IP address is greater than the 1st threshold value. In a case where the number of the request packets from the source IP address is greater than the 1st threshold (Yes in S61), the determination unit 23 determines that the request packet is an unauthorized request packet. In other words, the determination unit 23 determines that the source IP address is an address that is being illegally accessed. Accordingly, in S62, the blocking unit 25 controls to block access from the source IP address of the request packet. In a case where the number of the request packets from the source IP address is equal to or less than the 1st threshold (No in S61), the process proceeds to S63.

In S63, the determination unit 23 determines whether the number of the request packets from an IP address with the prefix length=64 including the source IP address is greater than the 2nd threshold value. In a case where the number of the request packets from an IP address with the prefix length=64 is greater than the 2nd threshold (Yes in S63), the determination unit 23 determines that the request packet is an unauthorized request packet. In other words, the determination unit 23 determines that an IP address with the prefix length=64 corresponds to an address area that is being illegally accessed. Accordingly, in S64, the blocking unit 25 controls to block access from an IP address with the prefix length=64 (i.e., an address belonging to the determined address area). In a case where the number of the request packets from an IP address with the prefix length=64 is equal to or less than the 2nd threshold (No in S63), the process proceeds to $65.

In S63, the determination unit 23 determines whether the number of the request packets from an IP address with the prefix length=44 including the source IP address is greater than the 3rd threshold value. In a case where the number of the request packets from an IP address with the prefix length=44 is greater than the 3rd threshold (Yes in S65), the determination unit 23 determines that the request packet is an unauthorized request packet. In other words, the determination unit 23 determines that an IP address with the prefix length=44 corresponds to an address area that is being illegally accessed. Accordingly, in S66, the blocking unit 25 controls to block access from an IP address with the prefix length=44 (i.e., an address belonging to the determined address area). In a case where the number of the request packets from an IP address with the prefix length=44 is equal to or less than the 3rd threshold (No in S65), the process proceeds to S67.

In S67, the determination unit 23 determines whether the number of the request packets from an IP address with the prefix length=32 including the source IP address is greater than the 4th threshold value. In a case where the number of the request packets from an IP address with the prefix length=32 is greater than the 4th threshold (Yes in S63), the determination unit 23 determines that the request packet is an unauthorized request packet. In other words, the determination unit 23 determines that an IP address with the prefix length=32 corresponds to an address area that is being illegally accessed. Accordingly, in S68, the blocking unit 25 controls to block access from an IP address with the prefix length=32 (i.e., an address belonging to the determined address area). In a case where the number of the request packets from an IP address with the prefix length=32 is equal to or less than the 4thd threshold (No in S67), the process proceeds to S68.

In S68, the determination unit 23 determines that the request packet is not an unauthorized request packet. In this case, the transmission unit 24 may transmit the request packet to the communication server apparatus 20. In a case where the process in FIG. 6 proceeds to the end, the process in FIG. 4 also ends.

As described above, the communication control apparatus 10 according to the present embodiment counts in the multiple stages corresponding to different range of address areas including the source address to determine whether the received request packet is an authorized request packet, i.e., whether the packet is received due to unauthorized access. The multiple stages may be specified arbitrarily by the communication control apparatus 10. The communication control apparatus 10 then determines whether or not the count value exceeds a predetermined threshold value. Specifically, the communication control apparatus 10 determines that the address area corresponding to the stage at which the count value exceeds the predetermined threshold value is the address area that is being illegally accessed. This enables appropriate determination of the address area that is being illegally accessed and avoids blocking access from an unnecessarily wide area.

In addition, the communication control apparatus 10 is configured so that the plurality of stages may be specified arbitrarily, so that unlike filtering targeting specific routes (i.e., route filtering), the address range to be filtered may be determined flexibly. Hence, it is possible to construct secure networks more flexibly.

Furthermore, even when using IPv6 address, which have a huge number of addresses, it is possible to effectively filter an address (i.e., an address area) for unauthorized access.

Note that in a case where access from the predetermined address or the predetermined address area is blocked in response to the process in S62, S64, S66, and S68, the blocking unit 25 may remain the blocked state for a certain period of time (e.g., 10) minutes) and then temporarily unblock it. Alternatively, the operator may release the blocked state by the blocking unit 25 via input unit 35.

In the present embodiment, the example of direct connection between the user device 1 and the communication control apparatus 10 is shown. As an alternative configuration, a communication system may be configured such that an IP source guard is placed between the user device 1 and the communication control apparatus 10. The IP source guard is a device with a function capable of preventing IP address spoofing. Specifically, the IP source guard has a function to filter a source address using a predetermined table to discard an access from an unauthorized source address. By placing the IP source guard, a source IP address of a request packet reaching the communication control apparatus 10 may be narrowed down, and thus the load on the counting and determination process in the counting unit 22 may be reduced.

Note that the present embodiment mainly refers to an embodiment capable of mainly countering an attack from a single attack source (i.e., DOS attack), but the present embodiment also makes it possible to counter an attack from a plurality of sources (i.e., DDos attack) by setting a threshold to be used for determination of unauthorized access or not.

Aspects of the present disclosure may include a computer-readable storage medium storing a program, wherein the program include instructions for casing the communication control apparatus 10 to perform at least one of the above-mentioned methods when executed by the CPU 31 (at least one of one or more processors) of the communication control apparatus 10.

While specific embodiments have been described above, the embodiments are illustrative only and are not intended to limit the scope of the invention. The apparatus and method described herein may be embodied in other forms than as described above. In addition, it is also possible to appropriately omit, replace, and change the above-described embodiment without departing from the scope of the present invention. Such omissions, substitutions and alterations fall within the scope of the appended claims and their equivalents and fall within the scope of the present invention.

Embodiment of the Disclosure

The disclosure includes the following embodiments.

[1] A communication control apparatus comprises: at least one processor; wherein the at least one processor being configured execute processing, the processing comprising: a receiving process for receiving a request packet to query a predetermined server; a counting process for counting, based on a source address of the request packet, in multiple stages corresponding to different ranges of address areas that include the source address; and a determination process for determining an address area corresponding to a stage, from the multiple stage, in which a count value by the counting process exceeds a predetermined threshold value as an unauthorized access address area that is a source of an unauthorized access.

[2] The communication control apparatus according to [1], wherein the counting process includes a process of specifying the multiple stages.

[3] The communication control apparatus according to [1] or [2], wherein the request packet is a packet compliant with Internet Protocol (IP), and the counting process counts for different prefix lengths in the multiple stages.

[4] The communication control apparatus according to any one of [1] to [3], wherein the predetermined threshold is set as a predetermined number of times during a certain period of time.

[5] The communication control apparatus according to any one of [1] to [4], wherein the predetermined threshold is set to be different for each of the plurality of stages.

[6] The communication control apparatus according to any one of [1] to [5], wherein the predetermined server is a Domain Name System (DNS) server.

[7] The communication control apparatus according to any one of [1] to [6], wherein the processing further comprising: a control process for controlling not receiving the request packet transmitted from an address belonging to the unauthorized access address area determined by the decision process.

[8] A communication control method comprises: receiving a request packet to query a predetermined server; counting, based on a source address of the request packet, in multiple stages corresponding to different ranges of address areas that include the source address; and determining an address area corresponding to a stage, from the multiple stage, in which a count value by the counting process exceeds a predetermined threshold value as an unauthorized access address area that is a source of an unauthorized access.

[9] A computer-readable storage medium storing a program, the program, when executed by at least one processor in a communication control apparatus, for causing the communication control apparatus to execute processing, the processing comprises: a receiving process for receiving a request packet to query a predetermined server; a counting process for counting, based on a source address of the request packet, in multiple stages corresponding to different ranges of address areas that include the source address; and a determination process for determining an address area corresponding to a stage, from the multiple stage, in which a count value by the counting process exceeds a predetermined threshold value as an unauthorized access address area that is a source of an unauthorized access.

REFERENCE SIGNS LIST 1a to 1c: User device, 10: Communication control apparatus, 20: Server apparatus 21: Receiving unit, 22: Counting unit, 23: Determination unit, 24: Transmitting unit 25: Blocking unit

What is claimed is:
1. A communication control apparatus comprising:
at least one processor,
the at least one processor being configured execute processing, the processing comprising:
 a receiving process for receiving a request packet among a plurality of request packets, wherein the request packet is configured to query a predetermined server;
 a counting process for counting, based on a source address of the request packet, in multiple stages corresponding to different ranges of address areas that include the source address, wherein the source address is a source IP address, and the counting in multiple stages comprises:
  i) counting a first number of occurrences of the source IP address occurring in the plurality of request packets,
  ii) counting a second number of occurrences of a first prefix of the source IP address occurring in the plurality of request packets,
  iii) counting a third number of occurrences of a second prefix of the source IP address occurring in the plurality of request packets, and
  iv) counting a fourth number of occurrences of a third prefix of the source IP address occurring in the plurality of request packets, wherein a first length of the first prefix is longer than a second length of the second prefix, and the second length of the second prefix is longer than a third length of the third prefix; and a determination process for determining an address area corresponding to a stage, from the multiple stages,
wherein the determination process detects an authorized access if: i) the first number exceeds a first predetermined threshold value, ii) the second number exceeds a second predetermined threshold value, iii) the third number exceeds a third predetermined threshold value, or the fourth number exceeds a fourth predetermined threshold value, and
wherein the first number is associated with a first access address area corresponding to the IP address, the second number is associated with a second access address area corresponding to the first prefix, the third number is associated with a third access area corresponding to the second prefix and the fourth number is associated with a fourth access area corresponding to the third prefix.

2. The communication control apparatus according to claim 1, wherein the predetermined threshold is set as a predetermined number of times during a certain period of time.

3. The communication control apparatus according to claim 1, wherein the predetermined server is a Domain Name System (DNS) server.

4. The communication control apparatus according to claim 1, wherein the processing further comprising:
a control process for blocking the request packet transmitted from an address belonging to the unauthorized access address area determined by the decision process.

5. A communication control method comprising:
receiving a request packet among a plurality of request packets, wherein the request packet is configured to query a predetermined server;
counting, based on a source address of the request packet, in multiple stages corresponding to different ranges of address areas that include the source address,
wherein the source address is a source IP address, and the counting comprises:
i) counting a first number of occurrences of the source IP address occurring in the plurality of request packets,
ii) counting a second number of occurrences of a first prefix of the source IP address occurring in the plurality of request packets,
iii) counting a third number of occurrences of a second prefix of the source IP address occurring in the plurality of request packets, and
iv) counting a fourth number of occurrences of a third prefix of the source IP address occurring in the plurality of request packets, wherein a first length of the first prefix is longer than a second length of the second prefix, and a third length of the third prefix is longer than the second length of the second prefix; and
determining an address area corresponding to a stage, from the multiple stages,
wherein the determining detects an authorized access if: i) the first number exceeds a first predetermined threshold value, ii) the second number exceeds a second predetermined threshold value, iii) the third number exceeds a third predetermined threshold value, or the fourth number exceeds a fourth predetermined threshold value, and wherein the first number is associated with a first access address area corresponding to the IP address, the second number is associated with a second access address area corresponding to the first prefix, the third number is associated with a third access area corresponding to the second prefix and the fourth number is associated with a fourth access area corresponding to the third prefix.

6. A non-transitory computer-readable storage medium storing a program, the program, when executed by at least one processor in a communication control apparatus, for causing the communication control apparatus to execute processing, the processing comprising:
a receiving process for receiving a request packet among a plurality of request packets, wherein the request packet is configured to query a predetermined server;
a counting process for counting, based on a source address of the request packet, in multiple stages corresponding to different ranges of address areas that include the source address, wherein the source address is a source IP address, and the counting in multiple stages comprises:
i) counting a first number of occurrences of the source IP address occurring in the plurality of request packets,
ii) counting a second number of occurrences of a first prefix of the source IP address occurring in the plurality of request packets,
iii) counting a third number of occurrences of a second prefix of the source IP address occurring in the plurality of request packets, and
iv) counting a fourth number of occurrences of a third prefix of the source IP address occurring in the plurality of request packets, wherein a first length of the first prefix is longer than a second length of the second prefix, and a third length of the third prefix is longer than the second length of the second prefix; and
a determination process for determining an address area corresponding to a stage, from the multiple stages,
wherein the determination process detects an authorized access if: i) the first number exceeds a first predetermined threshold value, ii) the second number exceeds a second predetermined threshold value, iii) the third number exceeds a third predetermined threshold value, or the fourth number exceeds a fourth predetermined threshold value, and
wherein the first number is associated with a first access address area corresponding to the IP address, the second number is associated with a second access address area corresponding to the first prefix, the third number is associated with a third access area corresponding to the second prefix and the fourth number is associated with a fourth access area corresponding to the third prefix.

7. The communication control apparatus of claim 1, wherein the request packet has first been filtered by a source guard using a table, wherein the filtering by the source guard reduces a filtering load on the communication control apparatus.

8. The communication control apparatus of claim 1, wherein the request packet is blocked when the respective predetermined threshold is crossed, and the blocking continues for ten minutes, after which the blocking ends.

* * * * *